United States Patent [19]

Younger

[11] Patent Number: 5,083,839
[45] Date of Patent: Jan. 28, 1992

[54] APPARATUS FOR GROOVING OR GRINDING PAVEMENT

[76] Inventor: Rick Younger, 4048 Pleasant Rd., Las Vegas, Nev. 89108

[21] Appl. No.: 544,602

[22] Filed: Jun. 27, 1990

[51] Int. Cl.$^5$ .................. E01C 23/09; E21C 25/10
[52] U.S. Cl. ........................... 299/89; 51/176; 51/206.5; 299/39; 404/90
[58] Field of Search ............... 299/39, 88, 89; 51/176, 51/206 R, 206 P, 206.5; 125/15; 404/90, 93

[56] References Cited

U.S. PATENT DOCUMENTS

| | | | |
|---|---|---|---|
| 1,828,740 | 10/1931 | Legge | 51/206.5 |
| 3,007,687 | 11/1961 | Hatcher | 299/39 |
| 3,016,661 | 1/1962 | Nielsen | 76/112 |
| 3,120,030 | 2/1964 | Metzger | 51/206 R |
| 3,195,957 | 7/1965 | Hatcher | 299/39 |
| 3,269,775 | 8/1966 | Hatcher | 299/39 |
| 3,306,669 | 2/1967 | Christensen et al. | 299/89 |
| 3,342,530 | 9/1967 | Krekeler | 299/89 |
| 3,608,969 | 9/1971 | Fowkes | 299/39 |
| 3,612,611 | 10/1971 | Ellis | 299/89 |
| 3,779,607 | 12/1973 | Staab | 299/39 |
| 3,801,211 | 4/1974 | Perkins | 404/75 |
| 3,874,806 | 4/1975 | Grist | 404/93 |
| 4,549,372 | 10/1985 | Sexton et al. | 51/206 R |

FOREIGN PATENT DOCUMENTS

| | | | |
|---|---|---|---|
| 774261 | 5/1957 | United Kingdom | 299/89 |
| 849450 | 9/1960 | United Kingdom | 299/89 |

*Primary Examiner*—David J. Bagnell
*Attorney, Agent, or Firm*—Quirk, Tratos & Roethel

[57] ABSTRACT

A rotary grooving or grinding drum is mounted about a drive shaft. The drum has an inner core of steel, an intermediate sleeve of neoprene rubber and an outer sleeve of steel. The neoprene intermediate sleeve provides absorption of the shocks, jars and harmonic vibrations that the drum undergoes during use. The exterior surface of the outer sleeve is provided with a plurality of cutting segments disposed in a particular configuration depending on whether it is desired to groove or grind the surface of the concrete or asphalt pavement. Each cutting segment or group of segments may be separately removable mounted on the exterior surface of the outer sleeve so that worn out cutting segments can be individually replaced.

16 Claims, 8 Drawing Sheets

APPARATUS FOR GROOVING OR GRINDING PAVEMENT

This invention relates to an apparatus for grooving or grinding pavement, and more particularly to an assembly that is used on a rotary grooving or grinding device for pavement.

BACKGROUND OF THE INVENTION

While concrete and asphalt pavement have long been used as the surface material for highways, airport runways and other transportation uses, it has only become popular in the last ten or twenty years to provide small, narrow grooves in the surface of the pavement to improve the frictional characteristics of the pavement.

Generally, highway pavement grooves run longitudinally in the direction of the traffic flow along the highway. This assists any water that accumulates on the road surface to run off and minimize the slipperiness of the road surface. It is believed that these longitudinal grooves are particularly effective on curves and exit and entrance ramps on freeways or limited access highways where permitted travel speeds are the highest.

Airport runways generally have grooves placed transverse to the direction of takeoff and landing of the airplanes to likewise increase the frictional characteristics of the runways. Similarly, the pavement used on bridges and overpasses are provided with grooves transverse to the direction of flow of the traffic.

In one type of process for providing longitudinal or transverse grooves in surface of concrete or asphalt pavement, the pavement is cut while still in the plastic or non-fully-hardened state by using a rotary cutting assembly. Typical of this process, and the equipment used in the process, is that shown in U.S. Pat. No. 3,801,211 (Perkins).

It has also been suggested that concrete or asphalt pavement that has already hardened can be grooved using a rotary cutting wheel apparatus. Typical of this type of apparatus is that shown in U.S. Pat. No. 3,612,611 (Ellis). The Ellis patent uses a plurality of cutter disks having abrasive peripheries. The disks are bolted together along the length of a rotary tubular sleeve. If it is desired to cut grooves in the roadway or in the runway, then the spaces between the cutting disks are relatively wide.

After long periods of use, concrete or asphalt pavement either on road surfaces or airport runways will often crack, spall and otherwise become irregular on its surface. It is often desirable to grind down the pavement surface to obtain a more uniform and flatter surface. It has been proposed to use what are commonly known as "bump cutters," which are basically rotary grinding wheels, to smooth the irregular surface of the pavement. The device shown in the Ellis patent can also be used as a bump cutter. As discussed in the specification of the Ellis patent, the spacing between the cutting disks is made relatively narrow if it is desired to merely grind the pavement to a level and smooth surface.

Conventionally, different machines have been used to either groove the pavement, whether longitudinally or transversely, or to grind the pavement back to a level and smooth surface. It would most practical to the industry if a single rotary assembly could be used to either groove or grind the surface of the pavement depending on the needs of the user.

Concrete and asphalt pavement do not have uniform hardnesses and some areas of the grooving or grinding assembly wear down at faster rates than other areas. There is also a need in the industry for a grooving or grinding assembly that has an easily replaceable cutting surface to allow new cutting segments to be added to the grooving or grinding assembly at those locations undergoing faster wear. This will improve the longevity of the assembly and provide for more satisfactory grooving or grinding of the pavement.

It is an object of the present invention to provide a rotary assembly for treating the surface of concrete or asphalt pavement to permit the grooving or grinding of the surface at the option of the user and to allow the replacement of worn out cutting segments.

It is a feature of the present invention that a rotary assembly is provided with interchangeable cutting segments that allows the user of the rotary assembly to selectively groove or grind the surface of concrete or asphalt pavement. One set of cutting segments are oriented on the rotary assembly for grooving while a different set of cutting elements are oriented on the rotary assembly for grinding. These interchangeable segments also permit replacement of worn out segments with new segments to achieve more uniform results from the desired operation.

It is an advantage of the present invention that a rotary assembly for treating the surface of concrete or asphalt pavement can alternatively be used either for grooving or grinding by merely orienting cutting segments on the rotary assembly in a particular manner. Similarly, more uniform and satisfactory grooving or grinding can be effected by replacing worn out cutting segments with new segments as needed.

SUMMARY OF THE INVENTION

A rotary grooving or grinding drum is mounted about a drive shaft. The drum has an inner core of steel, an intermediate sleeve of neoprene rubber and an outer sleeve of steel. The neoprene intermediate sleeve provides absorption of the shocks, jars and harmonic vibrations that the drum undergoes during use. The exterior surface of the outer sleeve is provided with a plurality of cutting segments disposed in a particular configuration depending on whether it is desired to groove or grind the surface of the concrete or asphalt pavement. Each cutting segment or group of segments may be separately removably mounted on the exterior surface of the outer sleeve so that worn out cutting segments can be individually replaced.

DETAILED DESCRIPTION OF THE PREFERRED EMBODIMENT

Figure 1:
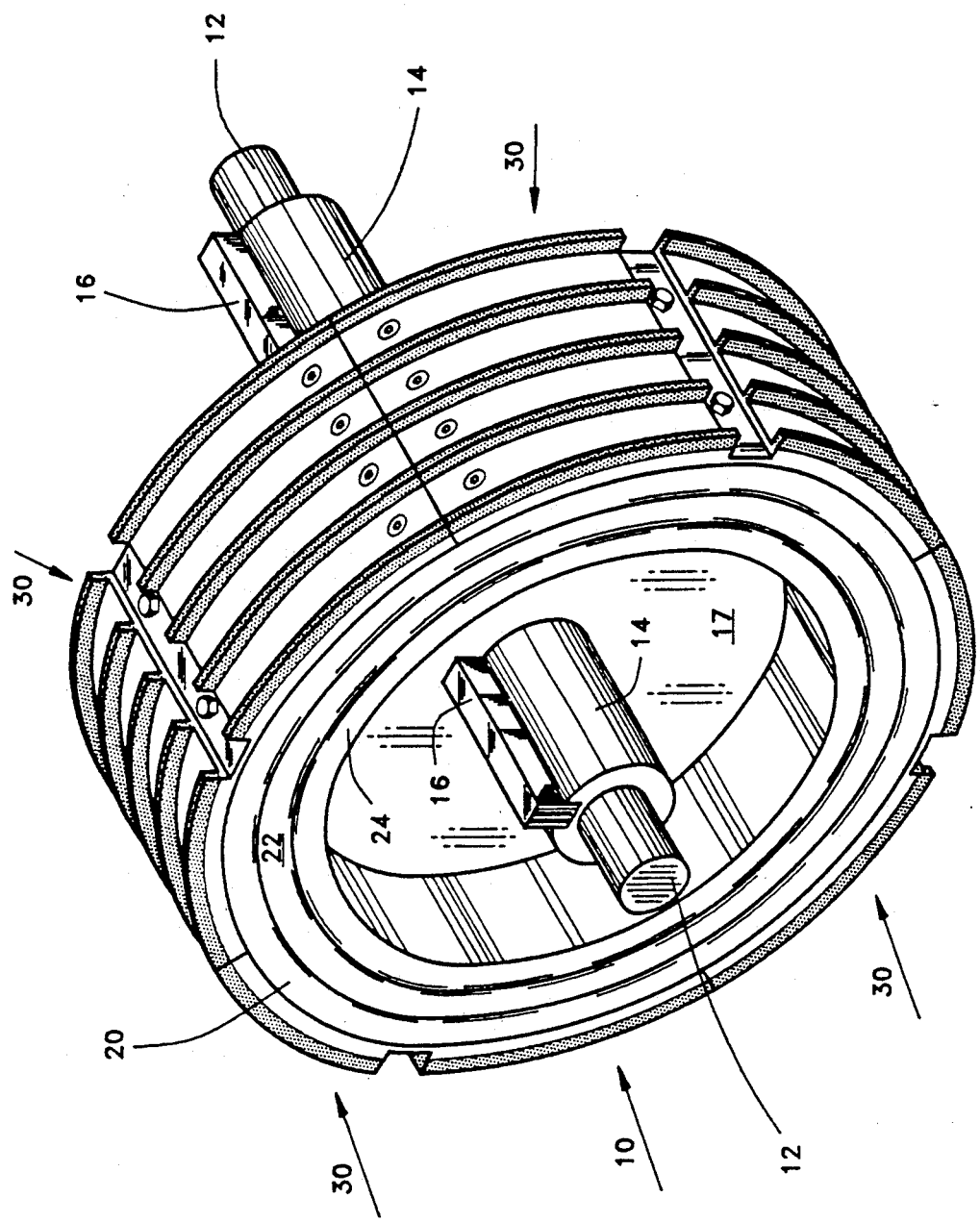
FIG. 1 shows in perspective the assembly of the present invention configured for grooving.
Figure 3:
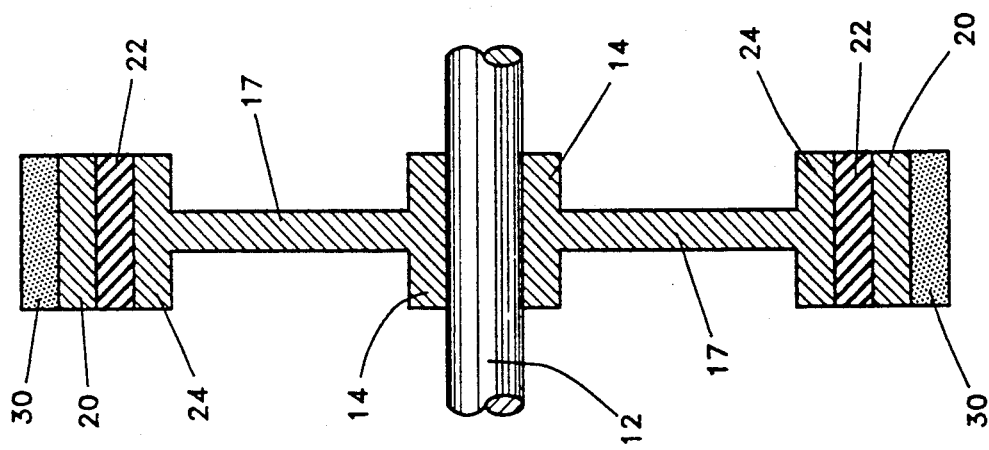
FIG. 3 shows a sectional view of a portion of the grooving assembly of the present invention taken along line 3—3 of FIG. 2.
Figure 2:
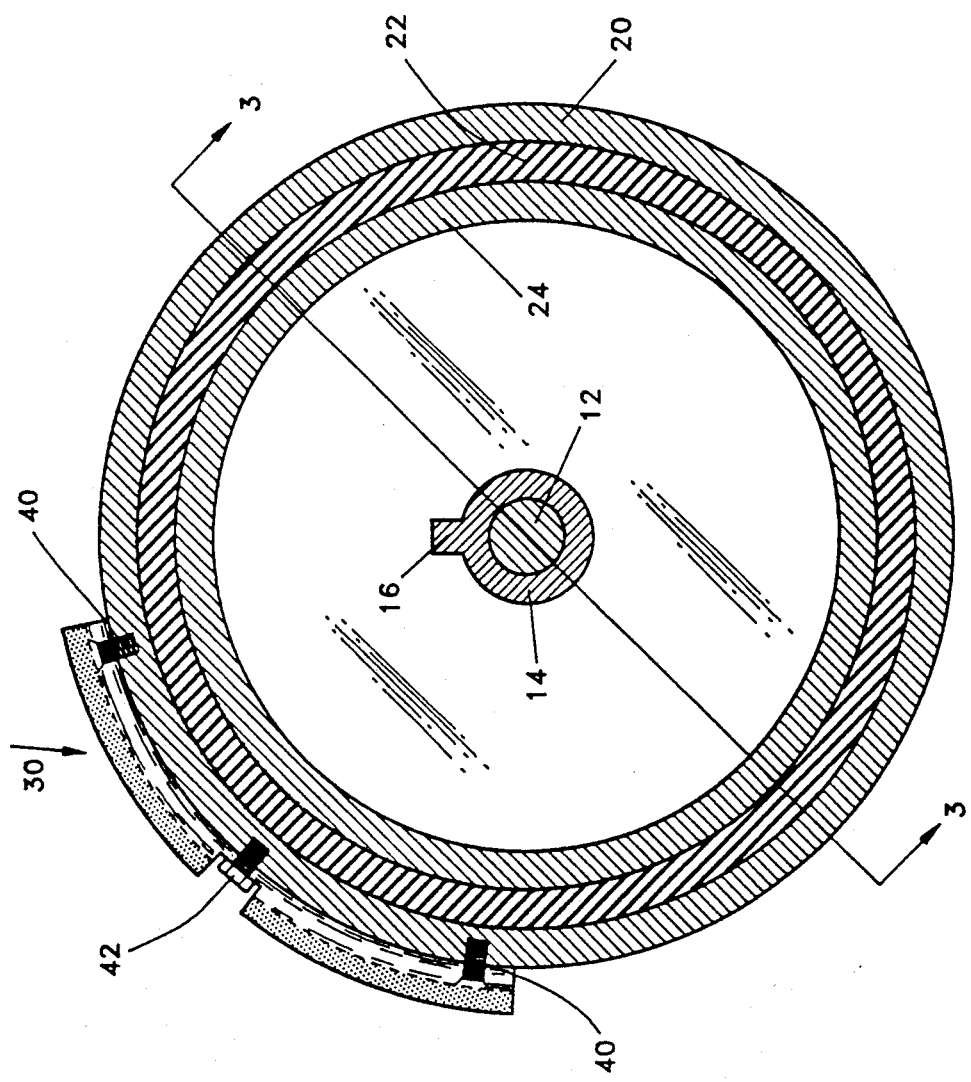
FIG. 2 shows an end view of the grooving assembly of FIG. 1 of the present invention.

The rotary grooving or grinding drum of the present invention is shown generally at 10 in FIGS. 1-5. The rotary drum 10 comprises an inner cylindrical core 24 having disposed thereon a plurality of sleeves. The sleeve adjacent to the inner cylindrical core 24 is an intermediate cylindrical sleeve 22 which absorbs the shocks, jars and harmonic vibrations imparted to the rotary drum during use. Adjacent the intermediate cylindrical sleeve 22 is an outer cylindrical sleeve 20 which acts as the mounting surface for the grooving segments 30.

The inner cylindrical core 24 has a support member 17 that cooperates with a sleeve 14 by means of a conventional keylock 16 that connects the rotary drum 10 to a drive shaft 12. The drive shaft 12 is mounted within a conventional power and transportation assembly (not shown) so that the rotary drum 10 can be positioned adjacent a concrete surface that needs to be grinded or grooved.

The inner cylindrical core 24 is preferably formed integrally with the support member 17 so that the rotary drum 10 can be easily slid onto the sleeve 14 and locked in place by the keylock 16 on the sleeve 14. The drive shaft 12 is press fit into or connected for rotation in any conventional manner to the sleeve 14. The inner cylindrical core 24 should be made from a strong material, preferably metal and most preferably steel or high strength aluminum.

The intermediate cylindrical sleeve 22 should be an impact resistant material used to absorb the shocks, impacts and harmonic vibrations that the rotary drum 10 receives during use. The intermediate cylindrical sleeve 22 is preferably a rubber or plastic material and neoprene rubber is seen to be most preferred.

The outer cylindrical sleeve 20 should be a hard material, such as steel, because this outer cylindrical sleeve 20 is used as the mounting surface for the grooving segments 30.

As shown in FIG. 1, a plurality of grooving segments 30 are disposed around the circumferential periphery of the outer cylindrical sleeve 20. In a preferred embodiment of the present invention, four grooving segments 30 are disposed end-to-end around the periphery, each grooving segment 30 forming approximately 90° segments of the circumference of the rotary drum 10. Alternatively, more or less than four of the grooving segments 30 could be used. If more than four grooving segments 30 are used, the user has increased flexibility to replace worn out or damaged segments. If less than four grooving segments 30 are used, the assembly time for preparing the rotary drum 10 for use is minimized. It is seen that the use of four grooving segments 30 combines most optimally a minimal assembly time with a maximal replaceability of one or more worn or damaged grooving segments 30.

Figure 5:
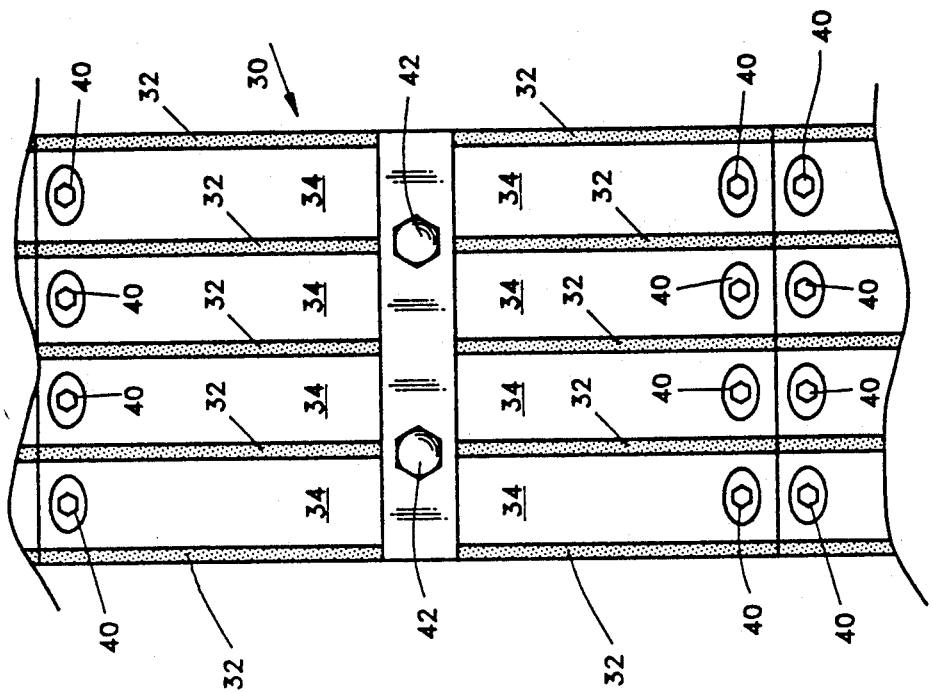
FIG. 5 shows a plan view of a portion of the grooving assembly of FIG. 1 of the present invention.
Figure 4:
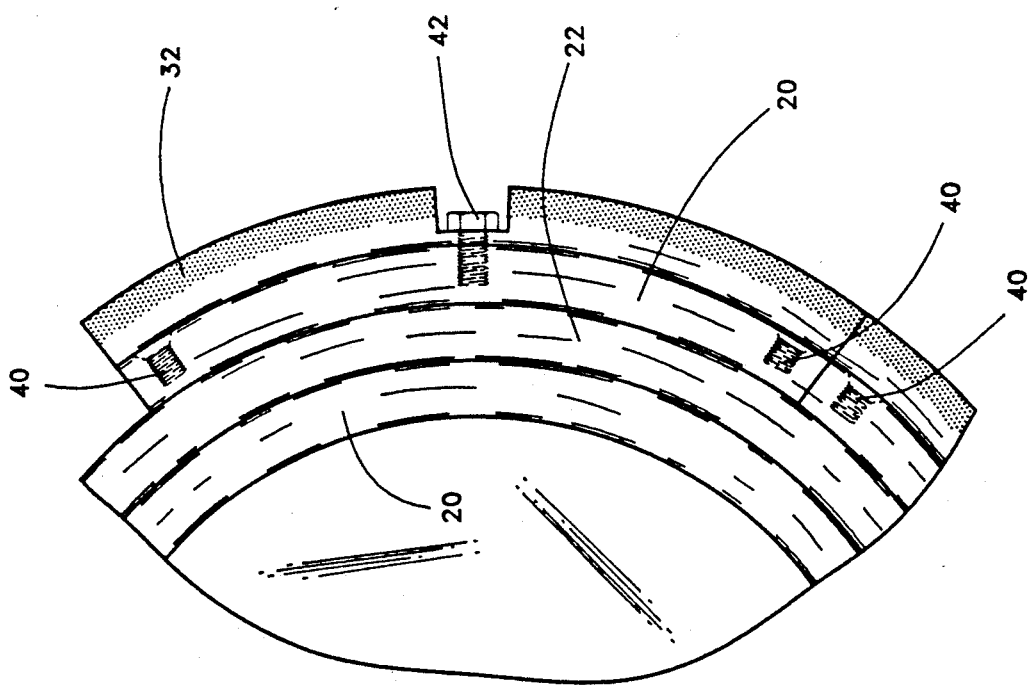
FIG. 4 shows an enlarged view of a section of the grooving assembly of FIG. 1 of the present invention.

As shown most clearly in FIGS. 1 and 5, each grooving segment 30 is preferably composed of a plurality of grooving surfaces 32 disposed in spaced parallel rows. Adjoining rows of grooving surfaces 32 are separated from one another by a channel 34 with the width of the channel 34 selected to correspond to the width between the grooves to be formed in the surface of the concrete. The width and depth of the actual groove formed in the surface of the concrete is determined by the lateral width of each grooving surface 32 and the distance that the grooving surface 32 extends above the surface of the channel 34.

In most applications, it is desirable to have the grooves that are made in the surface of the concrete approximately ⅛" wide and approximately 3/16" deep. The lateral distance between each groove in the surface of the concrete should be approximately ¾" on center.

The grooving surface 32 of the grooving segment 30 is fabricated from an abrasive material. In a preferred embodiment of this invention, the abrasive material can be diamond chips joined to the grooving segment 30, which is preferably a metallic material such as steel. The diamond chips are joined to the steel by any conventional method such as sintering.

Each grooving segment 30 is attached to the outer cylindrical sleeve 20 by means of any appropriate attachment device such as the bolts 40 and 42 as shown. In a preferred embodiment shown in FIGS. 1, 4 and 5, each end of a grooving segment 30 has four countersunk allen head bolts 40 holding the grooving segment 30 to the outer cylindrical sleeve 20, one bolt 40 disposed between each adjacent rows of grooving surfaces 32. There are also two hexagonal head bolts 42 at the approximate center of each grooving segment 30. This multiple bolt arrangement provides a secure attachment cf each grooving segment 30 to the outer cylindrical sleeve 20 which is necessary because in use the rotary drum 10 will be rotating at speeds on the order of 1000-3000 revolutions per minute depending on the application.

Figure 6:
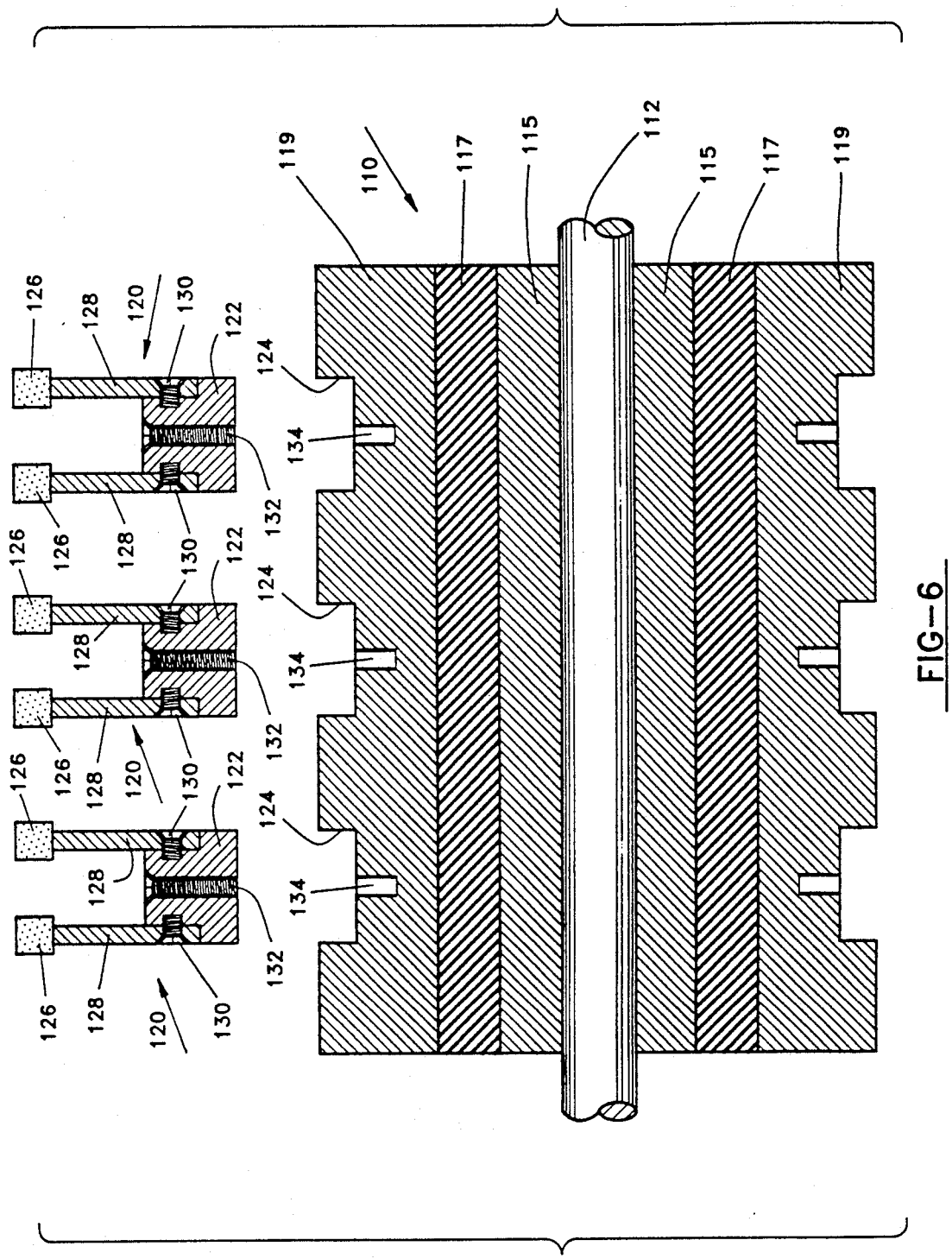
FIG. 6 shows an exploded view of an alternate embodiment of the grooving assembly of the present invention.

FIG. 6 shows an alternate embodiment of the present invention. A solid rotary drum 110 is mounted on a drive shaft 112. Concentric to the rotary drum 110 is an inner cylindrical sleeve 115 made of metal and adjacent thereto is an intermediate cylindrical sleeve 117, which is the shock absorber sleeve made of suitable plastic or rubber material, such as the preferred neoprene rubber. Concentric to the intermediate cylindrical sleeve 117 is an outer cylindrical sleeve 119 which is made from hard material such as steel. In the surface of the outer cylindrical sleeve 119 are a plurality of insert cavities 124 at appropriate locations about the periphery of the rotary drum 110. Each insert cavity 124 is provided on its bottom internal surface with a threaded slot 134.

Each insert cavity 124 is sized to receive a grooving segment 120 which, when attached to the rotary drum 110, will effect the grooving of the concrete pavement when the rotary drum 110 is rotated at high speed. The grooving segment 120 comprises a mounting insert 122 having a base sized to fit snugly into the insert cavity 124. A threaded aperture 132 is provided in generally the center of the mounting insert 122 and a screw (not shown) extends through the threaded aperture 132 and into the threaded slot 134 to hold the grooving segment 120 securely to the outer periphery of the rotary drum 110.

On each upper lateral edge of the mounting insert 122, there is provided a mounting arm 128 held securely to the mounting insert 122 by screws 130. An abrasive member 126 is attached to the upper end of each mounting arm 128. The abrasive member 126 actually effects the grooving of the concrete when the rotary drum 110 is rotated at high speed. In a preferred embodiment of this invention, the abrasive member 126 can be diamond chips joined to the mounting arm 128 which is preferably a metallic material such as steel. The diamond chips are joined to the steel by any conventional method such as sintering.

In use, when the rotary drum 110 is applied to a concrete surface for the purpose of providing grooves in the surface, eventually the abrasive member 126 will wear down. Whenever it is necessary or desirable to replace the abrasive member 126, it is a simple matter to unscrew the grooving segment 120 from the rotary drum 110 and replace a worn grooving segment 120 with a fresh grooving segment 120. Rather than discard the entire worn grooving segment 120, it is only necessary to replace the old mounting arm 128 having the worn abrasive member 126 with a new mounting arm 128 having a fresh abrasive member 126. In fact, even the old mounting arm 128 can be reused by removing the old abrasive member 126 and reattaching a new abrasive member 126 to the mounting arm 128 in any conventional manner, such as be resintering an abrasive material into the end of the old mounting arm 128. Should the abrasive members 126 wear unevenly, it is only necessary to replace those particular abrasive members 126 that show excessive wear while leaving in place those other abrasive members 126 at other locations on the drum 110 that do not yet need replacement. This allows work on the concrete to continue more expeditiously because there is less down time for repairs to the rotary drum 110.

Figure 7:
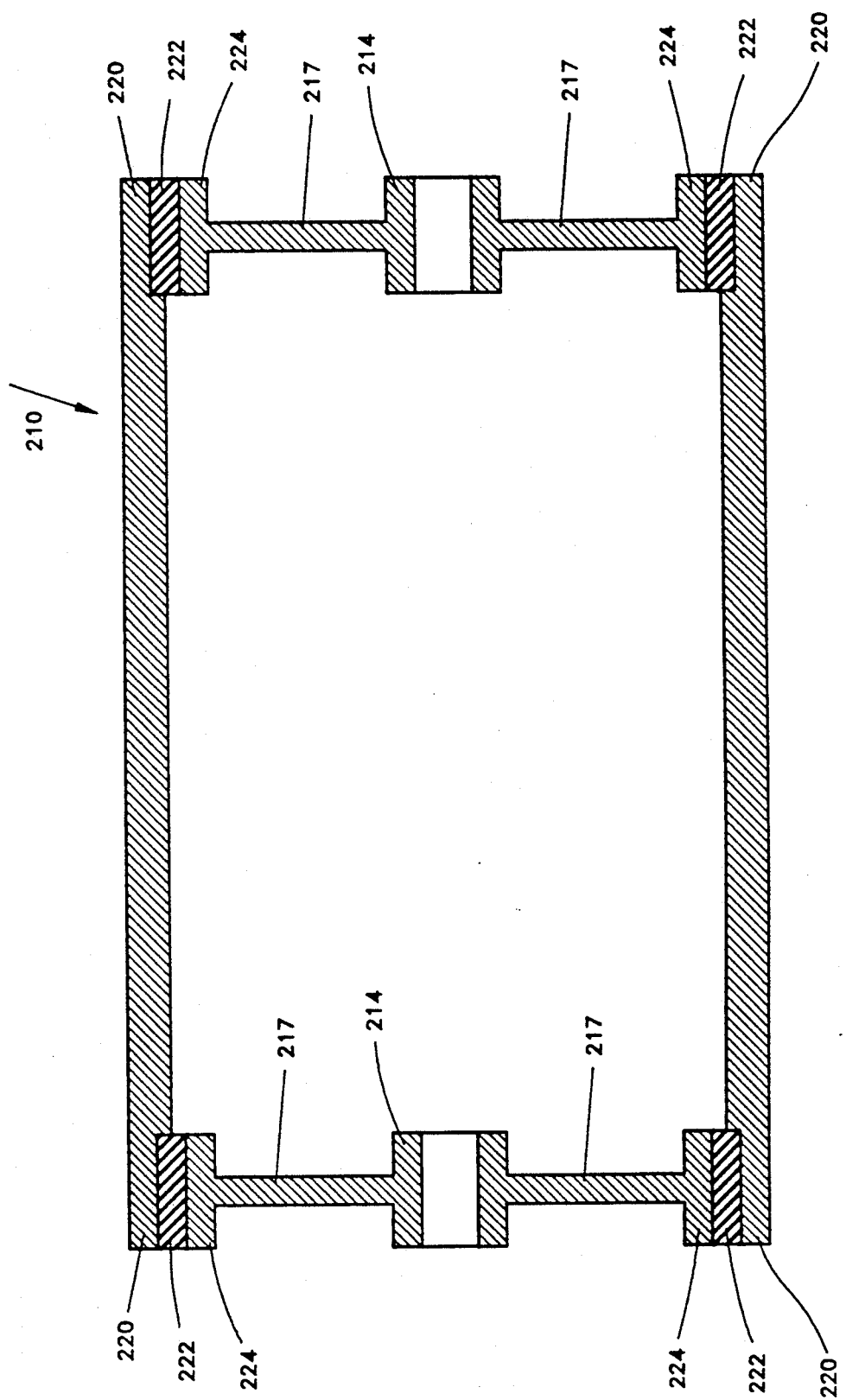
FIG. 7 shows another alternate embodiment of a portion of the grooving assembly of the present invention.

FIG. 7 shows another alternative embodiment of the assembly of the present invention. This embodiment is similar to the assembly shown in FIG. 1 but is more lightweight and can be used in less heavy duty grooving applications. A sleeve 214 is provided at each end of the rotary drum 210 and the sleeves are adapted to mount the rotary drum 210 on a drive shaft (not shown) in a manner similar to that shown in FIG. 1. The interior of the rotary drum is generally hollow to eliminate weight. Each sleeve 214 has a cylindrical web support 217 which on its periphery has an inner cylindrical segment 224 which is an integral part of the web support 217. Joined to the inner cylindrical segment 224 is an intermediate cylindrical segment 222 which acts as the shock absorber surface and is preferably made from plastic or rubber such as neoprene rubber. Attached to the intermediate cylindrical segment 222 is the outer cylindrical sleeve 220 made of a metal such as steel. The outer cylindrical surface 220 serves as the mounting surface for the grooving segments 30 shown in FIG. 1 or alternatively the outer cylindrical surface 220 can be modified to receive grooving segments similar to those shown at 120 in FIG. 6.

Figure 8:
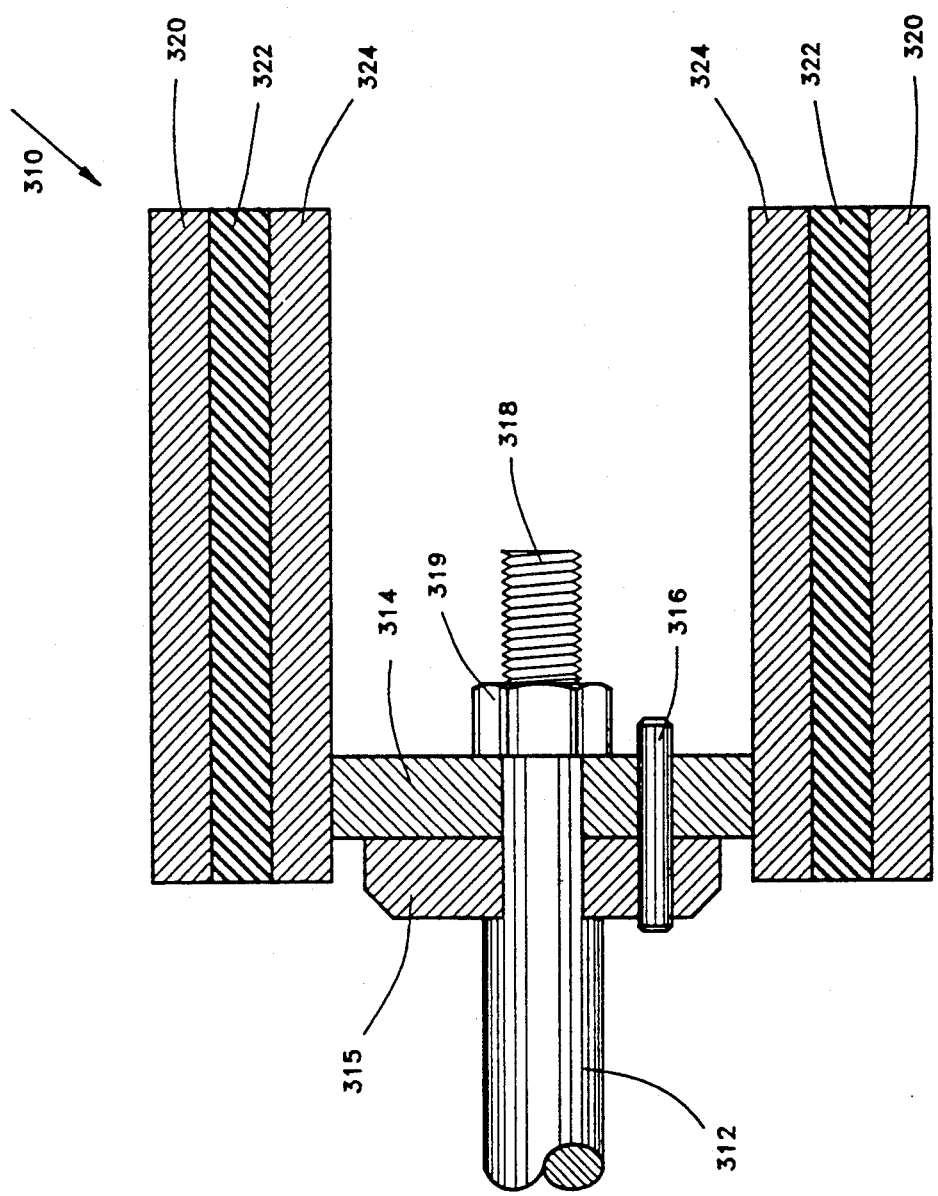
FIG. 8 shows yet another alternate embodiment of a portion of the grooving assembly of the present invention.

Yet another embodiment of the invention is shown in FIG. 8. Again this embodiment is similar to the embodiment shown in FIG. 1 except that this embodiment is designed to go on the end of a drive shaft 312 in a cantilevered configuration. As shown in FIG. 8, the rotary drum 310 is mounted by means of a sleeve 314 to the drive shaft 312. A connecting plate 315 locks the sleeve 314 to the drive shaft 312 for rotational movement through the use of a locking pin 316. The drive shaft 312 has a threaded end 318 that receives a nut 319 to hold the rotary drum 310 on the end of the drive shaft 312. The rotary drum comprises three cylindrical elements connected concentrically to the sleeve 314. The inner cylindrical core 324, the intermediate cylindrical core 322 and the outer cylindrical sleeve 320 are similar in configuration to the elements shown in FIG. 1. As in FIG. 1, the grooving segments are connected directly to the outer surface of the outer cylindrical sleeve 320 or alternatively the outer cylindrical surface 320 can be modified to receive grooving segments similar to those shown at 120 in FIG. 6.

Figure 9:
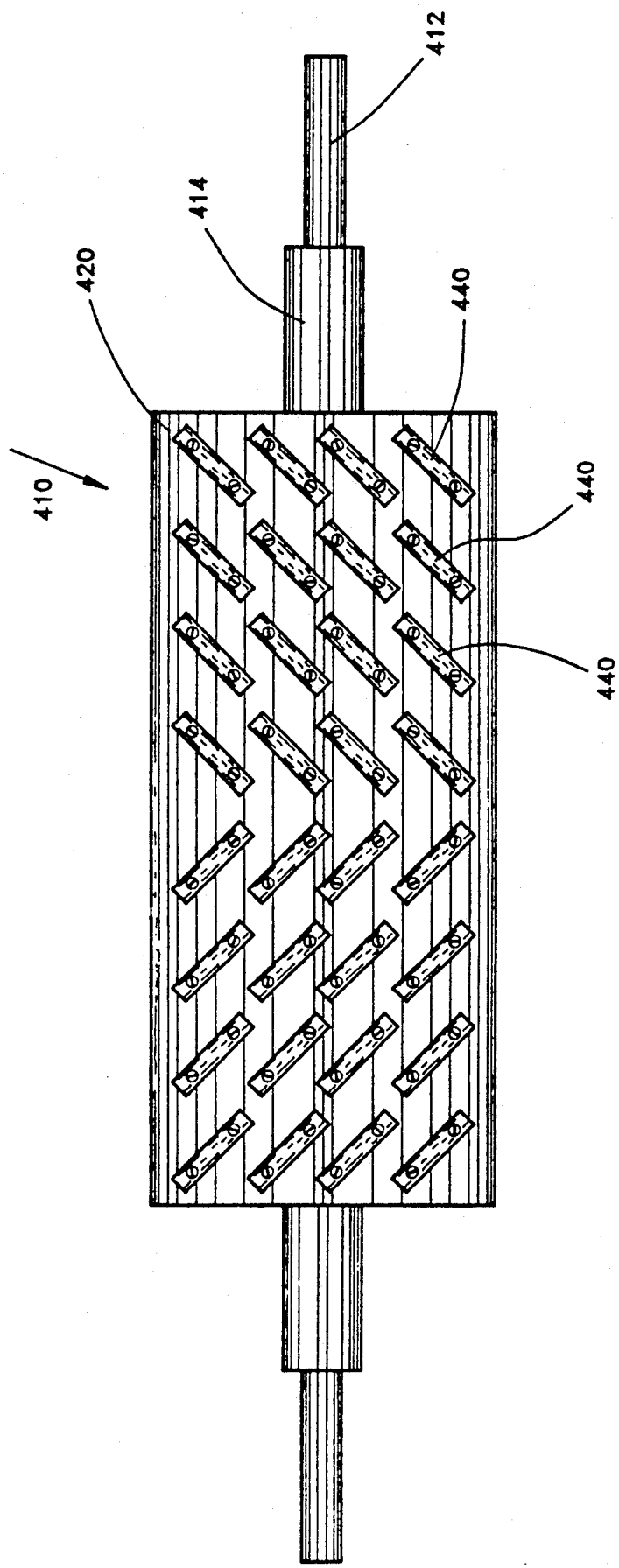
FIG. 9 shows an embodiment of the assembly of the present invention used for grinding pavement.

FIG. 9 shows an alternate embodiment of the invention in which the grooving segments on the outer periphery of the assembly are replaced by grinding segments. If it is desired to simply smooth rough pavement, rather then cut grooves in the pavement, the grinding segments need to be distributed over the surface of the assembly so that a grinding action may be imparted to the full surface of the pavement.

As shown in FIG. 9, the rotary drum 410 is mounted on the drive shaft 412 by means of sleeve 414 in the manner similar to that shown in FIG. 1. The grinding segments 440 are mounted to the outer surface 420 of the rotary drum 410 using the mounting configuration shown in FIG. 6. In the preferred embodiment, the grinding segments 440 are disposed at an angle to the direction of rotation of the rotary drum 410 as well as at an angle to the axis of the rotary drum thereby increasing the efficiency of the grinding effected by the rotary drum.

The grinding configuration shown in FIG. 9 can also be used with any of the other rotary drum configurations shown above depending on the type of drive shaft available and the application in which grinding is necessary. For example, rotary drum 110 shown in FIG. 6 could easily be fitted with angled segments in place of the straight grooved segments 126 if this configuration was to be adapted for grinding instead of grooving. Similarly, the rotary drum 210 of FIG. 7 and the rotary drum 310 of FIG. 8 could have grinding segments such as those shown in FIG. 9 mounted on the outer periphery of the drum to effect a grinding action instead of simply grooving the pavement.

Figure 10:
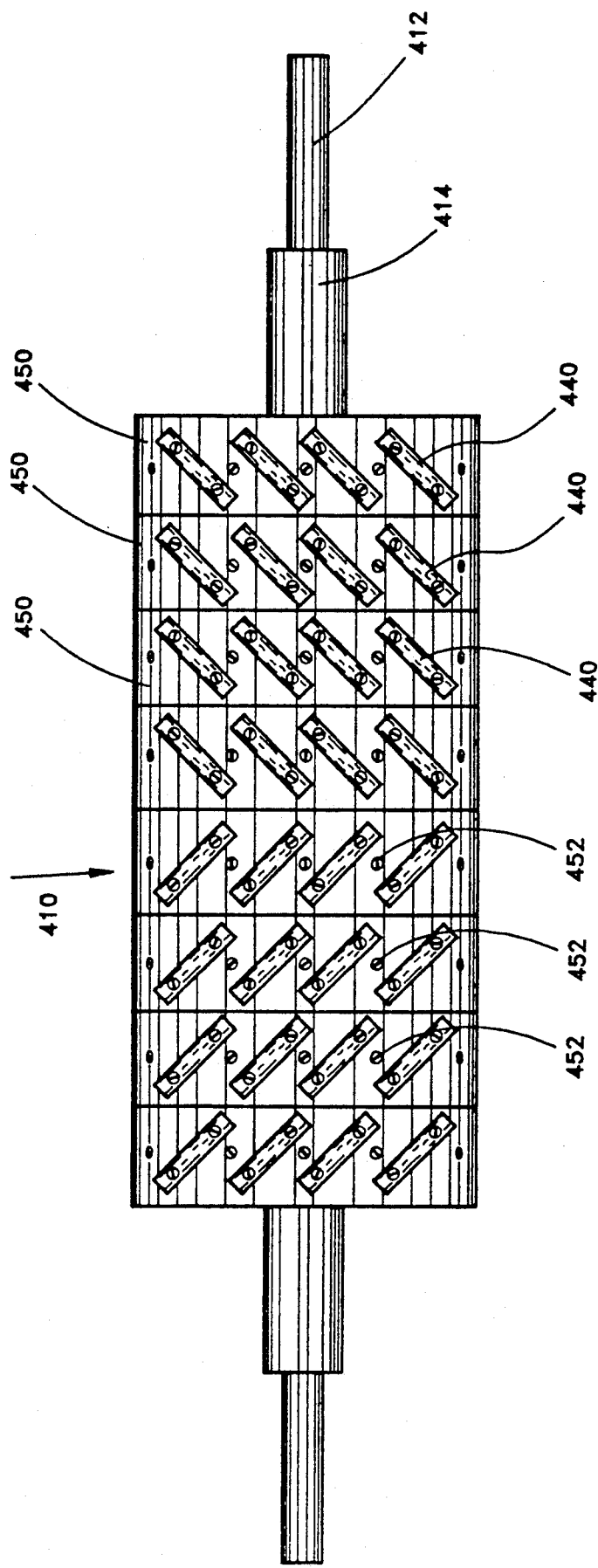
FIG. 10 shows another embodiment of the assembly of the present invention used for grinding pavement.

Another alternate embodiment of this grinding assembly is shown in FIG. 10. Individual circular grinding bands 450 are secured to the outer surface of the rotary drum 410 by using individual screws 452 in a manner similar to the construction shown in FIG. 1. Each grinding band 450 is then provided with a plurality of grinding segments 440 in the manner described above in connection with FIG. 9. This construction permits the operator to selectively choose the width of the grinding surface depending on the desired application.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. An apparatus comprising
   a) a drum used in a rotary assembly, the drum having an inner core of metal, an intermediate sleeve of synthetic material and an outer sleeve of metal, and b) a plurality of cutting segments separably fastened to the exterior surface of the outer sleeve of the drum, each cutting segment being a generally rectangular curvilinear member shaped to conform to the exterior surface of the drum.

2. The apparatus of claim 1 wherein the inner core is steel, the intermediate sleeve is neoprene rubber and the outer sleeve is steel.

3. The apparatus of claim 1 wherein each curvilinear member has a cutting surface comprised of abrasive material.

4. The apparatus of claim 3 wherein the abrasive material is diamond particles.

5. The apparatus of claim 3 wherein the cutting segments are disposed in at least one row arranged circumferentially about the drum whereby when the rotary drum is applied to a surface at least one parallel groove is cut into the surface.

6. The apparatus of claim 3 wherein the cutting segments are disposed in a plurality of parallel rows arranged circumferentially about the drum whereby when the rotary drum is applied to a surface a series of parallel grooves are cut into the surface.

7. The apparatus of claim 1 wherein each curvilinear member has a first cutting surface comprised of abrasive material and a second cutting surface comprised of abrasive material, the first and second cutting surfaces being separated by a spacer member that receives the fasteners for mounting the cutting segments to the drum.

8. The apparatus of claim 1 wherein the rotary drum comprises a sleeve element and support member joined to the sleeve element and supporting the inner core whereby the rotary drum is adapted for mounting to a drive shaft.

9. The apparatus of claim 8 wherein the sleeve element is joined to the support member by a keylock connection.

10. The apparatus of claim 1 wherein the outer sleeve has a plurality of insert cavities disposed around the periphery of the outer sleeve and each cutting segment is attached to the outer sleeve by being inserted into an insert cavity.

11. The apparatus of claim 10 wherein each cutting segment comprises a mounting insert that is shaped to fit into an insert cavity, at least one mounting arm attached to the mounting insert and an abrasive member joined to the mounting arm.

12. The apparatus of claim 1 wherein the rotary drum has a hollow interior.

13. The apparatus of claim 1 wherein the rotary drum is a cantilevered configuration and is adapted to be attached to the end of a drive shaft.

14. An apparatus comprising
a) a drum used in a rotary assembly, the drum having an inner core of metal, an intermediate sleeve of synthetic material and an outer sleeve of metal, and
b) a plurality of grinding segments mounted to the outer sleeve, each grinding segment comprising a generally rectangular curvilinear mounting insert attached to the outer sleeve and shaped to conform to the exterior surface thereof and an abrasive member attached to the mounting insert
whereby when the rotary drum is applied to a surface a grinding effect occurs which smooths the surface.

15. The apparatus of claim 14 wherein the mounting insert includes a mounting arm to which is attached the abrasive member.

16. An apparatus comprising
a) a drum used in a rotary assembly, the drum having an inner core of metal, an intermediate sleeve of synthetic material and an outer sleeve of metal, and
b) a plurality of concentric band segments mounted to the outer sleeve and shaped to conform to the exterior surface thereof, each band segment including a plurality of grinding segments separably fastened to the exterior surface thereof
whereby when the rotary drum is applied to a surface a grinding effect occurs which smooths the surface.

* * * * *